A. PHILIPOFF.
SAFETY FIRST AUTO SIGNAL.
APPLICATION FILED AUG. 27, 1920
1,372,369.
Patented Mar. 22, 1921.
2 SHEETS—SHEET 1.
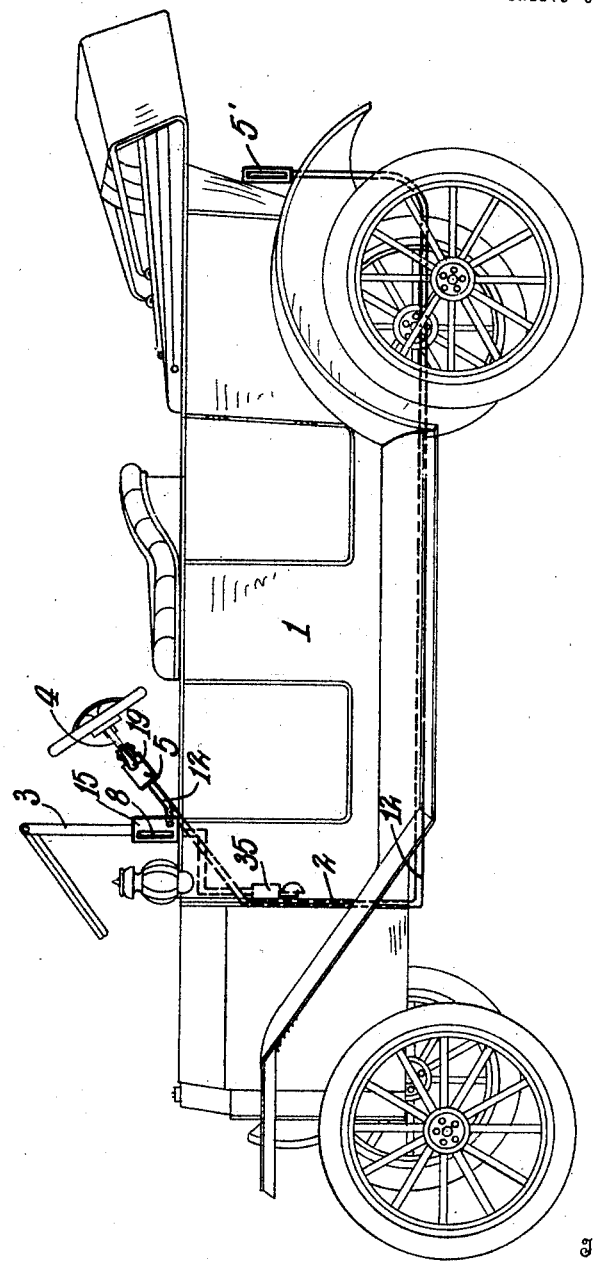
Inventor
Alexis Philipoff
By
Zoltan H. Polachek
Attorney A. PHILIPOFF.
SAFETY FIRST AUTO SIGNAL.
APPLICATION FILED AUG. 27, 1920.
1,372,369.
Patented Mar. 22, 1921.
2 SHEETS—SHEET 2.
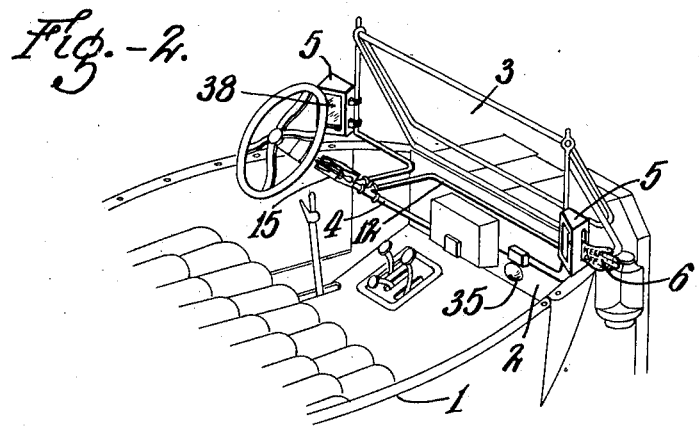
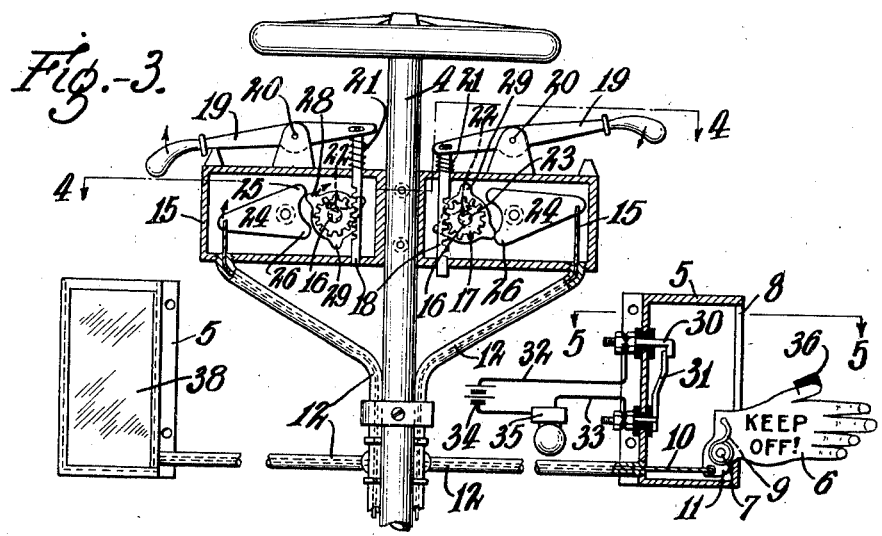
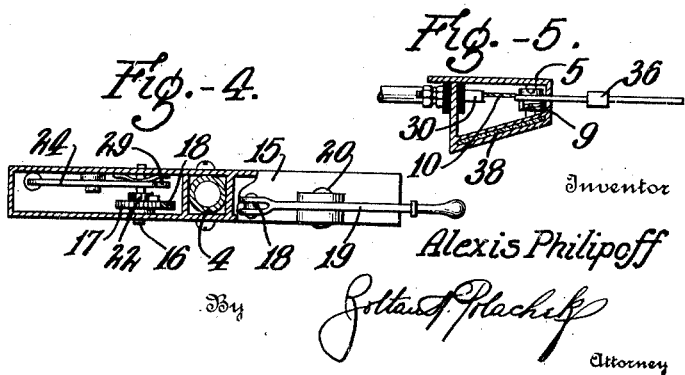
Inventor
Alexis Philipoff
By
Attorney

UNITED STATES PATENT OFFICE.

ALEXIS PHILIPOFF, OF NEW YORK, N. Y.

SAFETY-FIRST AUTO-SIGNAL.

1,372,369.      Specification of Letters Patent.      Patented Mar. 22, 1921.

Application filed August 27, 1920. Serial No. 406,274.

*To all whom it may concern:*

Be it known that I, ALEXIS PHILIPOFF, a citizen of Russia, residing at New York, in the county of New York and State of New York, have invented certain new and useful Improvements in Saftey-First Auto-Signals, of which the following is a specification.

This invention relates to a traffic signal for automobiles or other vehicles for giving visible indication to adjacent vehicles of a stop or turn.

The invention has for an object to provide a novel form of device of this kind whereby an indicating member may be thrown to visible position, preferably at either side of the vehicle as desired.

A further object is to combine both an audible and visual signal for vehicles.

For further comprehension of the invention, and of the objects and advantages thereof, reference will be had to the following description and accompanying drawings, and to the appended claims in which the various novel features of the invention are more particularly set forth.

Figure 1 of the drawings is a general view of an automobile having my improved traffic signal applied thereto.

Fig. 2 is a fragmentary perspective view showing the forward position of the automobile with the signal in position.

Fig. 3 is a detail view, partly in elevation and partly in central section, of the signal device, showing the control mechanism thereof mounted on the steering post of the automobile.

Fig. 4 is a horizontal section on the line 4—4 of Fig. 3.

Fig. 5 is a horizontal section on the line 5—5 of Fig. 3.

In the drawings the numeral 1 indicates generally the body of an automobile, 2 indicating the dash-board, 3 the windshield, and 4 the steering post, the detail construction of these parts having no reference to the present invention.

In the present embodiment of the invention I provide a suitable number of signal devices proper which may be secured at desired points on the automobile, such as the opposite sides of the windshield frame, as indicated in Figs. 1 and 2, being attached in plan by any suitable means. Each of these devices comprises a box 5 in which is pivotally mounted a signal member such as the hand 6 which is pivoted as at 7 adjacent the wrist portion thereof and is adapted to be swung downwardly and outwardly to horizontal position to give a signal or upwardly and inwardly to concealed position, a vertical slot 8 being provided in the wall of the box to accommodate the hand in its movement. A coiled spring 9 surrounding the hinge pintle of the hand acts to normally urge the latter to concealed position, the hand being swung to signaling position by means of a cord 10 connected to a short arm 11 thereon, this cord leading through suitable tubing 12 to the control or operating means.

Each of these devices is adapted to be individually operated and to this end a pair of operating devices are provided and located in position to be readily reached by the driver being shown in the drawings as carried upon opposite sides of the steering post of the automobile although they might, if desired, be mounted on the dash-board or some other part.

Each of these operating devices comprises a box 15 in which is journaled a shaft 16 upon which is mounted a gear 17 engaged by a vertical rack-bar 18 slidable in the box and having its upper end connected to one end of an operating handle 19 fulcrumed as at 20 on the top of the box 15. A spring 21 which surrounds the bar 18 and bears between the top of the box and the handle normally urges the bar upward. The gear 17 is preferably loose upon the shaft 16, having a one-way connection with the latter through the medium of a spring pressed pawl 22 on the gear engaging ratchet teeth 23 on the shaft.

Pivoted within the box 15 is an arm 24 in the form of an isosceles triangle having its pivot point in the median line thereof and near its base, the cord 10 above mentioned connecting to the apex of this triangular arm. The base of this arm is concavely curved to present a pair of projections 25 and 26 which are adapted to be engaged by points on a star wheel 29 fixed on the shaft 16 to operate the arm 24 and to hold it against movement as will be later set forth.

The audible signal which operates in conjunction with the visual signal just described comprises a fixed electrical contact member 30 which is adapted to be engaged by a spring contact 31, these contacts being suitably mounted on and insulated from the wall of the box 8. From these contacts 30 and 31 wires 32 and 33 respectively lead through a source of power such as the battery 34 to a bell 35. Upon the hand 6 is mounted an insulated block 36 which, when the hand is in its raised position, engages the spring contact 31 and retains it away from the fixed contact 30, it being understood that the strength of spring 9 is sufficient for this purpose. While I have illustrated only one of these audible signals it is to be understood that each of the boxes 5 will have the pair of contacts mounted therein and wired to the bell 35.

As illustrated in the drawings, the side of each of the boxes 5 which faces rearwardly may be in the form of a mirror 38 set at a suitable angle for the convenience of the driver. If desired a pair of the indicating devices proper may be mounted on the rear of the automobile and, one of these being indicated at 5' in Fig. 1.

The operation is as follows:

Normally the springs 9 keep the hands 6 in raised position concealed within the boxes 5 and holding the bell circuit open, the rack-bars 18 being raised by the springs 21. When it is desired to swing either of the hands outward to give warning to an adjacent vehicle the proper handle 19 is moved to depress the rack-bar, causing one of the points on the star wheel 29 to engage the projection 26 on the triangular arm 24 with a cam action and swing the arm in the direction of the arrow, pulling cord 10 and swinging the hand out, the parts assuming the position shown at the right side of Fig. 3. When the handle 19 is released, the rack-bar 18 rides back freely by reason of the ratchet and pawl connection, the parts remaining in this position by reason of the dead center engagement of projection 26 with the point in the star wheel. To swing the hand in, the handle is again operated, advancing the star-wheel again, the springs 9 and 21 moving the hand 6 and rack bar 18 respectively to their original positions one of the points 28 on the wheels 29 riding under the projection 25 on the arm 24 and locking the latter against movement in a direction to swing the hand out, this being the position indicated at the left in Fig. 3.

While I have here illustrated and described a preferred form of my invention it is to be understood that various changes and modifications might be made therein without departing from the spirit and scope of my invention as defined in the appended claims.

What I claim is:

1. A traffic signal for vehicles comprising a movable indicating member, and means for operating said member including a handle, a rack-bar operated thereby, a rotary element operated by the rack-bar and having operating and locking parts, and an arm in operative relation with said indicating member and having a pair of parts coöperating with the respective parts on the said rotary element.

2. A traffic signal for vehicles comprising a movable indicator, a flexible member connected to said indicator to operate the same, a triangular pivoted arm having the said flexible member connected to the apex thereof, the base of said arm being concaved to present a pair of projections at opposite ends thereof, a rotatable star-wheel having a series of projections adapted to engage respective ones of said first projections to operate or lock the said arm, and means for rotating said disk.

3. A traffic signal for vehicles comprising a movable indicator, a flexible member connected to said indicator to operate the same, a triangular pivoted arm having the said flexible member connected to the apex thereof, the base of said arm being concaved to present a pair of projections at opposite ends thereof, a rotatable star-wheel having a series of projections adapted to engage respective ones of said first projections to operate or lock the said arm, and means for rotating said disk said means comprising a gear fixed co-axially to said star-wheel, a rack-bar engaging said gear, and a handle connected to said rack-bar.

In testimony whereof I have affixed my signature.

ALEXIS PHILIPOFF.